US007150278B1

(12) United States Patent
Hampton

(10) Patent No.: US 7,150,278 B1

(45) Date of Patent: Dec. 19, 2006

(54) MULTIPLE BURNER GRILL

(76) Inventor: Craig Hampton, 3600 Emanuel Dr., Glendale, CA (US) 91208

( * ) Notice: Subject to any disclaimer, the term of this patent is extended or adjusted under 35 U.S.C. 154(b) by 80 days.

(21) Appl. No.: 10/217,706

(22) Filed: Aug. 10, 2002

Related U.S. Application Data

(60) Provisional application No. 60/381,080, filed on May 17, 2002.

(51) Int. Cl.
*A47J 37/00* (2006.01)

(52) U.S. Cl. ................. 126/38; 126/25 AA; 126/41 R; 126/50

(58) Field of Classification Search ............ 126/309 R, 126/9 R, 304 A, 25 R, 9 A, 9 B, 38, 50, 126/41 R, 25 AA, 276; 219/474, 452.13
See application file for complete search history.

(56) References Cited

U.S. PATENT DOCUMENTS 98,282 A * 12/1869 Madison ................... 126/25 R
605,011 A * 5/1898 Pringle ..................... 126/39 H
1,721,445 A * 7/1929 Hall ............................ 126/38
1,989,749 A * 2/1935 Fullerton .................. 126/37 B
1,991,135 A * 2/1935 Brown ........................ 126/38
2,077,687 A * 4/1937 Goldbert et al. ............ 219/400
2,307,914 A * 1/1943 Bitney ........................ 126/9 R
2,446,063 A * 7/1948 Cameron ................. 219/457.1
2,505,896 A * 5/1950 Jaffe et al. ................ 190/12 R
2,685,635 A * 8/1954 Neumann ................... 219/476
2,768,042 A * 10/1956 Persinger et al. ........... 108/152
2,780,474 A * 2/1957 Farah et al. ................ 280/641
2,805,658 A * 9/1957 Schlueter ..................... 126/30
3,094,113 A * 6/1963 Avila ........................... 126/30
3,790,750 A * 2/1974 Giannini ................ 219/452.13
D259,693 S * 6/1981 Ottmar ........................ D7/336
4,587,948 A * 5/1986 Haglund ...................... 126/38
4,809,671 A * 3/1989 Vallejo, Jr. ................ 126/39 R
5,313,928 A * 5/1994 Rodgers et al. ............... 126/38
6,293,272 B1 * 9/2001 Harneit ..................... 126/37 B

FOREIGN PATENT DOCUMENTS

FR 191436 * 10/1959

* cited by examiner

*Primary Examiner*—Carl D. Price
(74) *Attorney, Agent, or Firm*—Michael J. Wise; Perkins Coie LLP

(57) ABSTRACT

An improved barbeque grill having a plurality of gas-fueled cooking surfaces which can be stored in stacked relation, yet can be moved into essentially side-by-side relation for cooking.

15 Claims, 2 Drawing Sheets

20 24 22 24 22 24 22 18 16 28 30 21 14 10 14 14 12

24 22 24 22 24 22 18 18 20 20 21 16 14 14 14 26 12

MULTIPLE BURNER GRILL

RELATED CASES

This invention is described in my copending Provisional Application, Ser. No. 60/381,080, filed May 17, 2002.

FIELD OF INVENTION

This invention relates to barbeque grills and is particularly directed to improved barbeque grills having a plurality of cooking surfaces.

PRIOR ART

Outdoor cooking has long been a popular pastime and, in recent years, the development of barbeque grills has greatly increased the appeal of this practice. This has been especially true since the introduction of barbeque grills fueled with propane and the like. However, it is often necessary or desirable to cook several different types of foods for a single meal. Thus, some may prefer steaks, while others prefer chicken or seafood. Unfortunately, each of these different foods must be cooked at a respective temperature, whereas most gas-fueled grills only provide one burner. Consequently, it is necessary to cook the different foods sequentially, which greatly increases the amount of time required to prepare a meal and necessitates feeding the guests sequentially as their desired foods are cooked. Some multiple burner barbeque grills have been provided. However, these provide the burners is side-by-side arrangement which greatly increases the size of the grill and makes storage much more difficult. Thus, none of the prior art barbeque grills have been entirely satisfactory.

BRIEF SUMMARY AND OBJECTS OF INVENTION

These disadvantages of the prior art are overcome with the present invention and an improved barbeque grill is provided which enables a user to cook several different types of foods simultaneously at respective temperatures, yet is compact and convenient to store when not in use.

These advantages of the present invention are preferably attained by providing a barbeque grill having a plurality of cooking surfaces which store in stacked relation, yet which can be moved into essentially side-by-side relation for cooking and which can quickly and easily be returned to the stacked position when no longer needed.

Accordingly, it is an object of the present invention to provide an improved barbeque grill.

Another object of the present invention is to provide an improved barbeque grill having a plurality of cooking surfaces.

An additional object of the present invention is to provide an improved beabeque grill having a plurality of gas-fueled cooking surfaces.

A further object of the present invention is to provide an improved barbeque grill having a plurality of gas-fueled cooking surfaces, yet which can be stored conveniently in a minimum of space.

A specific object of the present invention is to provide an improved barbeque grill having a plurality of gas-fueled cooking surfaces which can be stored in stacked relation, yet can be moved into essentially side-by-side relation for cooking.

These and other objects and features of the present invention will be apparent from the following detailed description, taken with reference to the figures of the accompanying drawing.

DETAILED DESCRIPTION OF THE INVENTION

Figure 1:
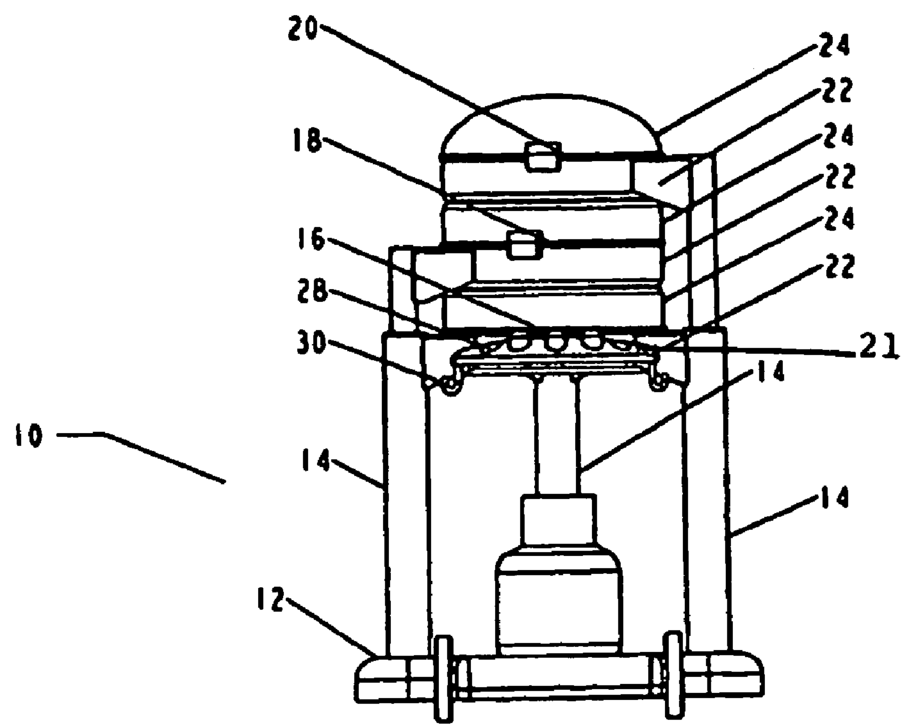
FIG. 1 is a front view showing a barbeque grill embodying the present invention, shown with the cooking surfaces in the stored position.
Figure 2:
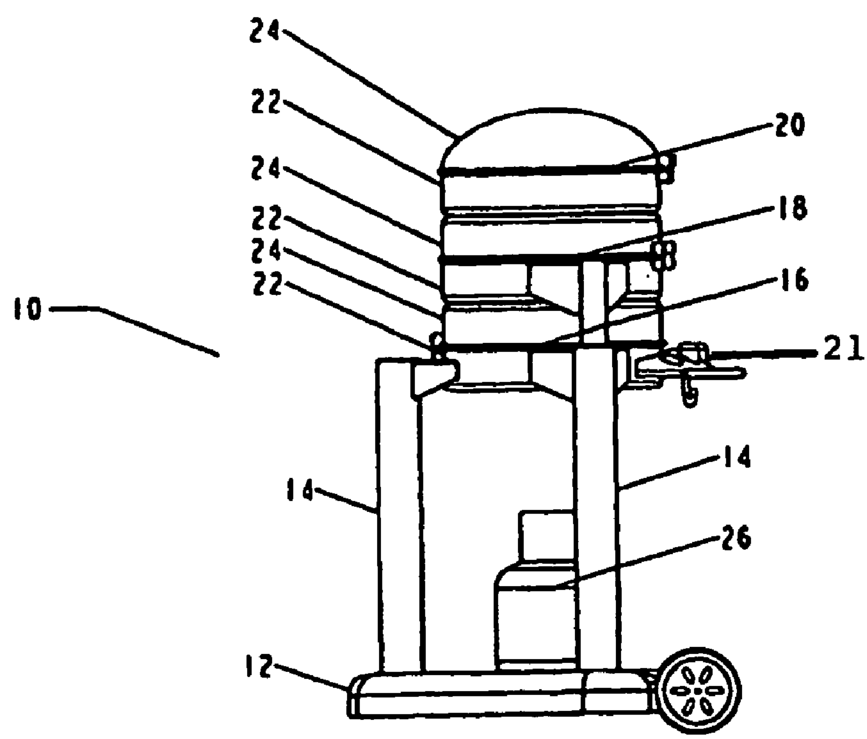
FIG. 2 is a side view of the barbeque grill of FIG. 1.
Figure 3:
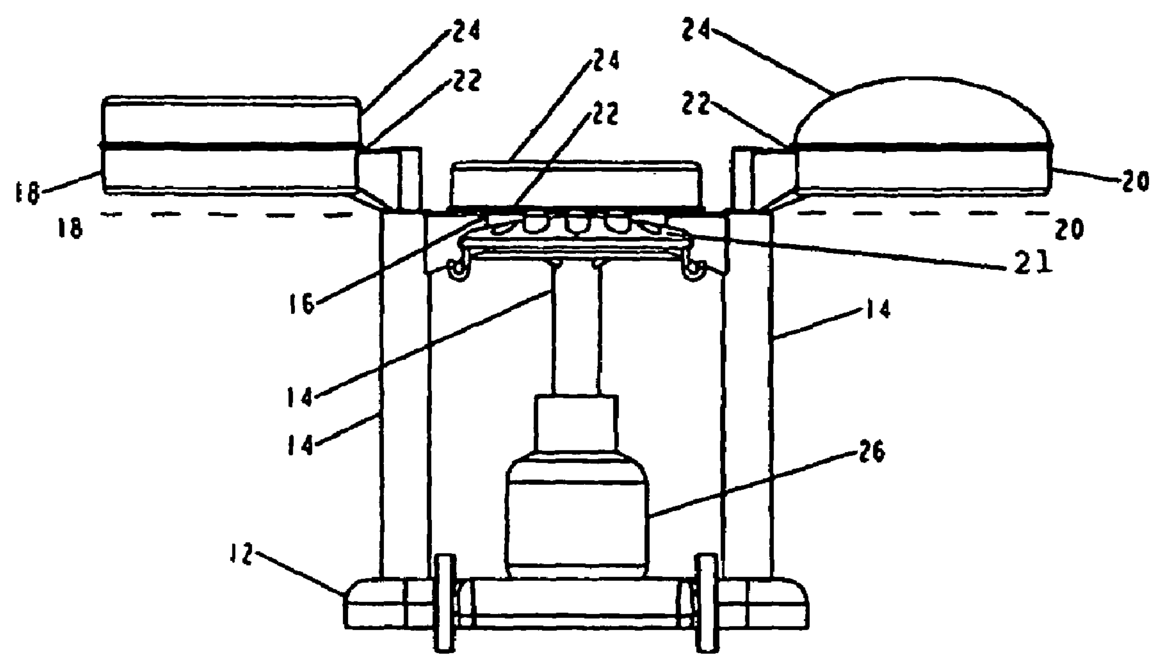
FIG. 3 is a front view of the barbeque grill of FIG. 1, showing the cooking surfaces extended for use.

In that form of the present invention chosen for purposes of illustration, FIG. 1 show a barbeque grill, indicated generally at 10 having a base 12 supported by a plurality of legs 14 supporting a plurality of cooking surfaces 16, 18 and 20. Each of the cooking surfaces 16, 18 and 20 comprises a burner 22 and a food supporting surface 24, such as a grill, griddle or the like. A fuel source, such as propane tank 26 may be stored in the base 12 and may be connected to supply the burners 22 in a conventional manner. Cooking surface 16 is mounted between several of the legs 14, while cooking surfaces 18 and 20 are pivotally mounted on respective ones of the legs 14 and are swingable between a stored position, in line with cooking surface 16, and an extended position, as seen in FIG. 3. If desired, the cooking surfaces 18 and 20 may be mounted so that in the extended position, they may be lowered to lie in the same plane with cooking surface 16, as shown in dotted lines at 18' and 20'.

In use, cooking surfaces 18 and 20 are normally located in the stored position, as seen in FIG. 1, which allows the barbeque grill 10 to be stored conveniently in a minimum of space. When the user desires to do some cooking, they move the grill 10 to a desired location and swing cooking surfaces 18 and 20 to their extended positions. This provides the user with a plurality of cooking surfaces whose cooking temperatures may be individually controlled by temperature controllers 21. Thus, cooking surface 16 may be adjusted to a high heat for cooking steaks or the like, while cooking surfaces 18 and 20 may be set to lower cooking temperatures for cooking chicken, fish or other items. Also if desired, the food supporting surface 24 of cooking surface 16 may be a grill, while the food supporting surface 24 of cooking surface 18 may be a griddle and the food supporting surface 24 of cooking surface 20 may be ribbed or otherwise formed for cooking specialized items. If desired, recesses 28 may be provided to receive beverage containers or the like and hooks 30 may be provided to allow cooking utensils or the like to be hung thereon.

Obviously, numerous variations and modifications can be made without departing from the spirit of the present invention. Therefore, it should be clearly understood that the form of the present invention described above and shown in the figures of the accompanying drawing is illustrative only and is not intended to limit the scope of the present invention.

What is claimed is:

1. A barbeque grill comprising:

a base, and a plurality of cooking surfaces, each of said plurality of cooking surfaces defining a food supporting surface facing toward a first direction, the first direction extending away from the food supporting surface, one of said cooking surfaces being fixedly mounted on said base and lying substantially on a given level position, and at least one other of said cooking surfaces being mounted to rotate about an axis that is parallel to said first direction to permit movement from a first stored position and a second extended position, said first stored position in substantial alignment with said base and also in substantial alignment with said one of said cooking surfaces such that the food supporting surface of said at least one other of said cooking surface faces substantially in the same said first direction defined by the food supporting surface of the one of said cooking surface fixedly mounted on the base, the second extended position being located beyond a periphery of said one of said cooking surfaces such that said at least one other of said cooking surfaces is not aligned with said one of said cooking surfaces, said at least one other of said cooking surfaces being mounted for movement when in the second extended position between a raised position located at a level above the one of said cooking surfaces, and a lowered position, said lowered position being located substantially on the same said given level as the cooking surface being fixedly mounted on the base wherein when in use at least a portion of the at least one other of said cooking surfaces, when moved to the second extended position, is lowered to substantially lie on the same said given level as the cooking surface being fixedly mounted on the base.

2. The grill of claim 1 further comprising:

a fuel source stored within said base and connected to supply said cooking surfaces.

3. The grill of claim 1 wherein:

each of said cooking surfaces comprises a burner and a food supporting surface for maintaining food in a desired position above said burner.

4. The grill of claim 1 further comprising separate temperature controls for each of said cooking surfaces.

5. The grill of claim 1 further comprising:

at least one recess formed in said base for receiving a beverage container.

6. The grill of claim 1 further comprising:

means for releasably attaching cooking utensils to said grill.

7. A barbeque grill comprising:

a base;

a first cooking surface and a second cooking surface, the first cooking surface and the second cooking surface each comprising a food supporting surface facing toward a first direction, the first direction extending away from the food supporting surface;

the first cooking surface being fixedly mounted on said base and lying substantially on a given level position;

the second cooking surface being mounted to rotate about an axis that is parallel to said first direction to permit movement between a stored position and an extended position, the stored position being in alignment with said base and the first cooking surface such that the food supporting surface of the second cooking surface faces substantially in the same first direction as the food supporting surface of the first cooking surface, the second extended position being located beyond a periphery of the first cooking surface such that the second cooking surface is not aligned with the first cooking surface; and the second cooking surface being mounted for movement when in the extended position between a raised position, located at a level above the first cooking surface and a lowered position located substantially on the same given level as the first cooking surface, wherein when in use, at least a portion of the second cooking surface, when moved to the second extended position, is lowered to substantially lie in the same said given level as the first cooking surface.

8. The barbeque grill of claim 7 wherein when in use, the second cooking surface, when moved to the extended position, is lowered to substantially lie in the same said given level as the first cooking surface.

9. The barbeque grill of claim 7 further comprising a fuel source, and wherein the first cooking surface and the second cooking surface each further comprises a gas burner.

10. The barbeque grill of claim 9 further comprising one or more temperature controls for independently controlling the temperature of the first cooking surface and the second cooking surface.

11. A barbeque grill comprising:

a base;

a first cooking surface comprising a food supporting surface facing toward a first direction extending away from the food supporting surface, being fixedly mounted on the base and lying on a first given level;

a second cooking surface comprising a food supporting surface and being mounted to rotate about an axis that is parallel to said first direction to permit movement between a stored position and an extended position, the stored position being in alignment with said base and the first cooking surface such that the food supporting surface of the second cooking surface faces substantially in the same first direction as the food supporting surface of the first cooking surface, the second extended position being located beyond a periphery of the first cooking surface such that the second cooking surface is not aligned with the first cooking surface;

the second cooking surface being mounted for movement when in the extended position between a raised position, located at a level above the first cooking surface and a lowered position located substantially on the same given level as the first cooking surface;

wherein when in use, at least a portion of the second cooking surface, when moved to the second extended position, is lowered to substantially lie in the same said given level as the first cooking surface.

12. The barbeque grill of claim 11 wherein when in use, the second cooking surface, when moved to the second extended position, is lowered to substantially lie in the same said given level as the first cooking surface.

13. The barbeque grill of claim 11 wherein when in use, the second cooking surface, when moved to the second extended position, is lowered to lie in the same said given level as the first cooking surface.

14. The barbeque grill of claim 11 further comprising a fuel source, and wherein the first cooking surface and the second cooking surface each comprise a gas burner.

15. The barbeque grill of claim 14 further comprising one or more temperature controls for independently controlling the temperature of the first cooking surface and the second cooking surface.

* * * * *